US008179962B2

(12) United States Patent  
Lim et al.

(10) Patent No.: US 8,179,962 B2
(45) Date of Patent: May 15, 2012

(54) MOTION IMAGE ENCODING METHOD AND MOTION IMAGE DECODING METHOD

(75) Inventors: Chong Soon Lim, Singapore (SG); Sheng Mei Shen, Singapore (SG); Shinya Kadono, Hyogo (JP)

(73) Assignee: Panasonic Corporation, Osaka (JP)

( * ) Notice: Subject to any disclaimer, the term of this patent is extended or adjusted under 35 U.S.C. 154(b) by 1498 days.

(21) Appl. No.: 11/659,723

(22) PCT Filed: Sep. 6, 2005

(86) PCT No.: PCT/JP2005/016329
§ 371 (c)(1),
(2), (4) Date: Feb. 8, 2007

(87) PCT Pub. No.: WO2006/028088
PCT Pub. Date: Mar. 16, 2006

(65) Prior Publication Data
US 2007/0206679 A1 Sep. 6, 2007

(30) Foreign Application Priority Data

Sep. 8, 2004 (JP) ................................. 2004-260474

(51) Int. Cl.
H04B 1/66 (2006.01)
H04N 7/12 (2006.01)
(52) U.S. Cl. ......... 375/240.02; 375/240.03; 375/240.13; 375/240.18; 375/240.24
(58) Field of Classification Search ............. 375/240.02, 375/240.03, 240.24, 240.13, 240.18
See application file for complete search history.

(56) References Cited

U.S. PATENT DOCUMENTS 5,021,891 A * 6/1991 Lee ................................ 382/250
(Continued)

FOREIGN PATENT DOCUMENTS

CA 2 240 118 12/1998
(Continued)

OTHER PUBLICATIONS

Wiegand et al., Joint Video Team (JVT) of ISO/IEC MPEG & ITU-T VCEG (ISO/IEC JTC1/SC29/WG11 and ITU-T SG16 Q.6), Draft ITU-T Recommendation and Final Draft International Standard of Joint Video Specification (ITU-T Rec. H.264/ISO/IEC 14496-10 AVC), JVT-G050, Mar. 2003, p. 30, 34-36, 53-55, 123-126.*
(Continued)

Primary Examiner — Eleni Shiferaw
Assistant Examiner — Hilary Branske
(74) Attorney, Agent, or Firm — Wendroth, Lind & Ponack, L.L.P.

(57) ABSTRACT

The present invention provides a video coding method and a video decoding method which allow enhancement of coding efficiency and improvement in video quality. A video coding apparatus includes: a mode determination unit which determines a notification method for notifying a transform block size to be used in orthogonal transform of a current block to be either the implicit mode or the explicit mode, and outputs the ABT mode indicating the determined notification method; an orthogonal transformation unit which transforms the difference values between the input image and predicted image into frequency coefficients based on the transform block size determined in accordance with the determined notification method; a quantization unit which quantizes the frequency coefficients and output the quantized values; and a variable length coding unit which performs variable length coding on the quantized values, the ABT mode, and the like, so as to output a coded stream.

19 Claims, 16 Drawing Sheets

U.S. PATENT DOCUMENTS

| | | | |
|---|---|---|---|
| 6,148,109 | A | 11/2000 | Boon et al. |
| 2001/0028682 | A1 | 10/2001 | Nakaya et al. |
| 2003/0123738 | A1 | 7/2003 | Frojdh et al. |
| 2004/0062309 | A1* | 4/2004 | Romanowski et al. .. 375/240.16 |
| 2004/0156550 | A1* | 8/2004 | Govindaswamy et al. ... 382/239 |
| 2005/0025246 | A1* | 2/2005 | Holcomb ................ 375/240.23 |
| 2005/0259877 | A1* | 11/2005 | Wang et al. .................. 382/236 |

FOREIGN PATENT DOCUMENTS

| | | |
|---|---|---|
| EP | 0 843 484 | 5/1998 |
| EP | 0 884 912 | 12/1998 |
| JP | 11-69362 | 3/1999 |
| JP | 2005-510983 | 4/2005 |
| WO | 97/46021 | 12/1997 |
| WO | 03/047268 | 6/2003 |

OTHER PUBLICATIONS

Wien, Joint Video Team (JVT) of ISO/IEC MPEG & ITU-T VCEG (ISO/IEC/JTCl/SC29/WG11 and ITU-T SG16 Q.6, ABT Coding for Higher Resolution Video, JVT-B053, Feb. 2002, p. 1-30.*

Wien, Variable Block-Size Transforms for Hybrid Video Coding, Degree Thesis, Institut für Nachrichtentechnik der Rheinisch-Westfälischen Technischen Hchschule Aachen, Feb. 2004.*

Joint Video Team (JVT) of ISO/IEC MPEG & ITU-T VCEG (ISO/IECJTC1/SC29/WG11 and ITU-T SG16 Q.16), Draft Text of H.264/AVC *Fidelity Range Extensions Amendment*, JVT-L047d9, Jul. 2004, pp. v-vi, 14-15, 30-34, 57-58.

Joint Video Team (JVT) of ISO/IEC & ITU-T VCEG (ISO/IECJTC1/SC29/WG11 and ITU-T SG16 Q.6), ABT *Coding for Higher Resolution Video*, JVT-B053, Feb. 2002, pp. 1-30.

Joint Video Team (JVT) of IO/IEC MPEG & ITU-T VCEG (ISO/IECJTC1/SC29/WG11 and ITU-T SG16Q.6), Draft ITU-T Recommendation and Final Draft International Standard of Joint Video Specification (ITU-T Rec. H. 264/ISO/IEC 14496-10 AVC), JVT-G050, Mar. 2003, pp. 30, 34-36, 53-55 and 123-126.

* cited by examiner ns in a picture, and the like, and only one transform block size is sometimes sufficient for the picture. In such a case, a flag for disabling use of plural transform block sizes (i.e., enabling use of a fixed transform block size) is set at the beginning of a sequence or a picture so that the transform block size is switched from one to another only when the flag is off.
MOTION IMAGE ENCODING METHOD AND MOTION IMAGE DECODING METHOD

TECHNICAL FIELD

The present invention relates to a video coding method for coding an input picture on a block-by-block basis so as to generate a coded stream and a video decoding method for decoding the coded stream on a block-by-block basis.

BACKGROUND ART

Video coding methods and video decoding methods include some methods which support adaptive block transform; methods defined by the ISO/IEC 14496-10 (MPEG-4 AVC) standard, and the like can be given as an example. When video is coded, the adaptive block transform allows orthogonal transform of blocks while switching various sizes of blocks on a macroblock basis in the video sequence (see, for example, Non-patent Reference 1 and Non-patent Reference 2). This feature provides less coding distortion and better coded image quality than a method which uses only one transform block size. The appropriate transform block size depends on the size of video, the details of the motions in a picture, and the like, and only one transform block size is sometimes sufficient for the picture. In such a case, a flag for disabling use of plural transform block sizes (i.e., enabling use of a fixed transform block size) is set at the beginning of a sequence or a picture so that the transform block size is switched from one to another only when the flag is off.

There are two types of conventional methods, namely an implicit mode and an explicit mode, for notifying a transform block size to be used for a macroblock. In the implicit mode, a motion compensation block size is used to determine a transform block size. For example, in the case where a motion compensation block size is equal to 8×8 pixels or larger than 8×8, the transform block size is 8×8.In the case where a motion compensation block size is smaller than 8×8, the transform block size is 4×4.

In this mode, an additional syntax element indicating the transform block size is not transmitted at the macroblock level. Therefore, information indicating the transform block size does not need to be coded, and thus the number of bits indicating the transform block size can be reduced. However, since the transform block size is not always linked with the motion compensation block size, this mode does not always allow a selection of an appropriate transform block size, compared with the case where a transform block size varies from one macroblock to another.

The other mode is an explicit mode for transmitting additional information indicating a transform block size for a macroblock at the macroblock level. As an example, a flag can be set at the macroblock level which is larger than or equal to an 8×8 motion compensation block. This flag indicates whether a transform block size is 8×8 or 4×4.If the motion compensation block size is smaller than 8×8, the transform block size is fixed to 4×4.This mode allows an encoder to explicitly set a transform block size for each macroblock in a picture, thus allowing it to always select the best transform block size. However, since a transform block size needs to be coded for each macroblock, there is a problem in that additional bits are needed to code the transform block size.

Non-patent Reference 1: ISO/IEC 14496-10 Advanced Video Coding First Edition: Dec. 1, 2003 (H.264/AVD standard)

Non-patent Reference 2: Draft Text of H.264/AVC Fidelity Range Extensions Amendment: JVT-L047 July, 2004 (a draft of H.264/AVC Amd standard)

SUMMARY OF THE INVENTION

Problems that Invention is to Solve

The above-mentioned prior arts have the following problems to be solved. A problem to be solved for the implicit mode is that various transform block sizes cannot be flexibly used in a picture in order to enhance the coded image quality. On the other hand, a problem for the explicit mode is that additional information needs to be notified, at the macroblock level, to each picture to which adaptive block transform is applied, and a large number of bits are required for such notification. Particularly, this additional information often impedes the coding efficiency of a picture in a video sequence which is to be coded at a high compression ratio (i.e., a low bit rate). It is acceptable to completely disable a use of adaptive block transform for such a picture and not to transmit the additional information at the macroblock level. However, disabling adaptive switching of transform block sizes could result in decline in the coded image quality of some pictures.

The present invention has been conceived in view of the above circumstances, and has an object to provide a video coding method and a video decoding method which allow enhancement of coding efficiency as well as improvement in video quality.

Means to Solve the Problems

In order to achieve the above object, the video coding method according to the present invention is a video coding method for coding an input picture on a block-by-block basis so as to generate a coded stream, and includes: determining a notification method for notifying a transform block size to be used in orthogonal transform of a current block; creating an adaptive block transform mode indicating the notification method; and adding the adaptive block transform mode to the coded stream.

Here, it is preferable to determine either an implicit mode or an explicit mode as the notification method, the implicit mode being a mode in which the transform block size is determined based on information regarding the current block, and the explicit mode being a mode in which a transform size flag indicating the transform block size is added to each predetermined unit of blocks.

By doing so, it is possible to select and use the implicit mode or the explicit mode as a method for notifying a transform block size. Therefore, it is possible to flexibly switch between the implicit mode and the explicit mode, for example, for each sequence, each picture or each slice. Accordingly, it is possible to efficiently use adaptive block transform, enhance coding efficiency, and improve video quality.

In the implicit mode, the transform block size may be determined based on a motion compensation block size used for motion compensation of the current block. By doing so, for example, it is possible to select a large transform block size when a motion compensation block size is large, and select a small transform block size when a motion compensation block size is small.

In the implicit mode, the transform block size may be determined based on motion vectors of blocks adjacent to the current block. For example, since great differences in respective motion vectors of adjacent blocks mean that a current block includes complicated motions (in various directions), a selection of a small transform block size allows an encoder to code differences faithfully.

In the implicit mode, the transform block size may be determined based on a quantization parameter used for quantization of the current block. For example, since a quantization parameter of a large value (a large quantization step size) often requires an increase in the compression ratio by reducing the number of bits, a selection of a large transform block size allows reduction in the number of bits after coding.

The video decoding method according to the present invention is a video decoding method for decoding a coded stream on a block-by-block basis, and includes: obtaining, from the coded stream, an adaptive block transform mode indicating a notification method for notifying a transform block size used in orthogonal transform of a current block; identifying the notification method based on the adaptive block transform mode; determining the transform block size based on the identified notification method; and decoding the current block by performing inverse orthogonal transform on the current block using the determined transform block size.

Here, it is preferable that the adaptive block transform mode indicates either an implicit mode or an explicit mode as the notification method, the implicit mode being a mode in which the transform block size is determined based on information regarding the current block, and the explicit mode being a mode in which a transform size flag indicating the transform block size is added to each predetermined unit of blocks.

With this structure, it is possible to identify the method for notifying a transform block size and determine the transform block size based on information in a coded stream indicating the implicit mode or the explicit mode selected on each sequence, each picture or each slice.

Note that it is possible to embody the present invention not only as such a video coding method and a video decoding method, but also as a video coding apparatus and a video decoding apparatus including, as units, the characteristic steps of these methods, as well as a program for causing a computer to execute these steps. Furthermore, such a program can be distributed by recording media including CD-ROM and over transmission media including the Internet.

Effects of the Invention

The video coding method and the video decoding method according to the present invention can enhance coding efficiency and improve video quality.

NUMERICAL REFERENCES

| 100 | Video coding apparatus |
|---|---|
| 101 | Motion estimation unit |
| 102 | Motion compensation unit |
| 103 | Difference calculation unit |
| 104 | Orthogonal transformation unit |
| 105 | Quantization unit |
| 106 | Inverse quantization unit |
| 107 | Inverse orthogonal transformation unit |
| 108 | Addition unit |
| 109 | Picture memory |
| 110 | Variable length coding unit |
| 111 | Mode determination unit |
| 200 | Video decoding apparatus |
| 201 | Variable length decoding unit |
| 202 | Inverse quantization unit |
| 203 | Inverse orthogonal transformation unit |
| 204 | Motion compensation unit |
| 205 | Addition unit |
| 206 | Picture memory |
| 207 | Mode determination unit |

DETAILED DESCRIPTION OF THE INVENTION

An embodiment of the present invention will hereinafter be described with reference to the drawings.

Figure 1:
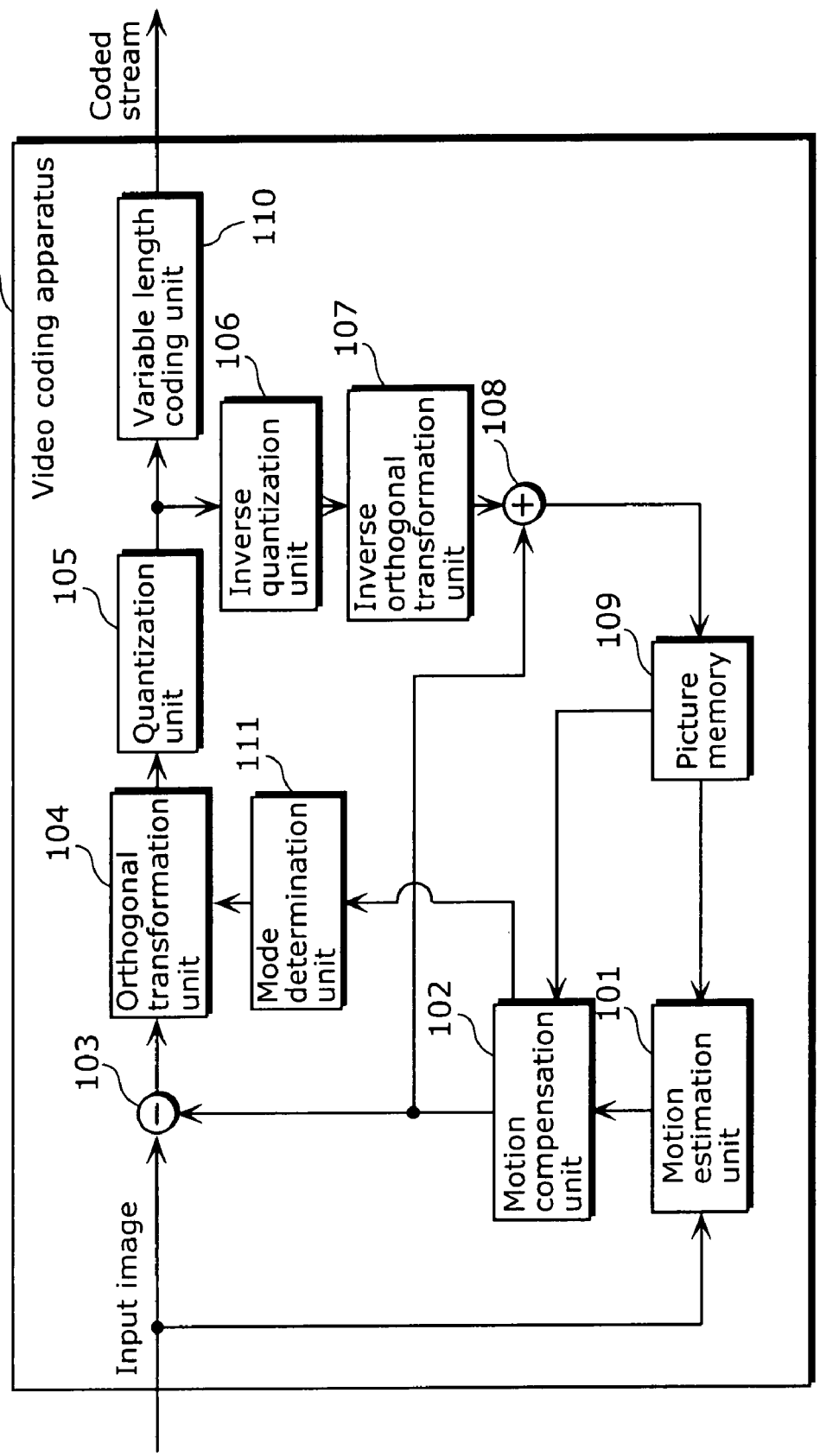
FIG. 1 is a block diagram which shows a structure of a video coding apparatus in an embodiment of the present invention.

FIG. 1 is a block diagram which shows a structure of a video coding apparatus in the embodiment of the present invention.

The video coding apparatus 100 is an apparatus for coding an input picture on a block-by-block basis so as to generate a coded stream, and as shown in FIG. 1, it includes a motion estimation unit 101, a motion compensation unit 102, a difference calculation unit 103, an orthogonal transformation unit 104, a quantization unit 105, an inverse quantization unit 106, an inverse orthogonal transformation unit 107, an addition unit 108, a picture memory 109, a variable length coding unit 110, and a mode determination unit 111.

An input image is inputted to the motion estimation unit 101 and the difference calculation unit 103. The motion estimation unit 101 searches within decoding pictures stored in the picture memory 109, estimates an image area which is most similar to the input image, and determines a motion vector indicating the location of that area. This estimation of the motion vector is performed in units of motion compensation blocks of a predetermined size. The motion compensation unit 102 extracts the best image area as a predicted image from a decoded picture stored in the picture memory 109, using the motion vector determined by the motion estimation unit 101 so as to generate the predicted image.

The mode determination unit 111 determines whether or not it is better to perform adaptive block transform, namely, perform orthogonal transform while selecting one transform block size for each block of a predetermined size (for each macroblock in the present embodiment) from among plural transform block sizes. When performing such adaptive block transform, the mode determination unit 111 also determines a notification method (hereinafter also referred to as a "mode") for notifying a transform block size to be used in orthogonal transform of a current block. In other words, the mode determination unit 111 determines the notification method to be either the implicit method (hereinafter also referred to as an "implicit mode") in which a transform block size is determined based on a motion compensation block size used for motion compensation of a current block; and the explicit method (hereinafter also referred to as an "explicit mode") in which a transform size flag indicating a transform block size is added on a macroblock basis. The mode determination unit 111 further outputs, to the variable length coding unit 110, an adaptive block transform flag (hereinafter also referred to as an ABT flag) indicating whether or not to use adaptive block transform as well as an adaptive block transform mode (hereinafter also referred to as an ABT mode) indicating which mode is determined as a notification method, the implicit mode or the explicit mode.

It should be noted that the process for determining the notification method is also performed at the sequence level, the picture level or the slice level. The ABT flag and the ABT mode are obtained at a higher level than a macroblock in a sequence parameter set, a sequence header, a picture parameter set, a picture header, or a slice header.

On the other hand, when receiving the input image, the difference calculation unit 103 calculates the difference values between the input image and the predicted image, and outputs the difference values to the orthogonal transformation unit 104. The orthogonal transformation unit 104 transforms difference values into frequency coefficients based on the transform block size determined in accordance with the notification method determined by the mode determination unit 111, and outputs the resulting coefficients to the quantization unit 105. The quantization unit 105 quantizes the inputted frequency coefficients, and outputs the resulting quantized values to the variable length coding unit 110.

The inverse quantization unit 106 inversely quantizes the inputted quantized values so as to reconstruct frequency coefficients, and outputs the resulting coefficients to the inverse orthogonal transformation unit 107. The inverse orthogonal transformation unit 107 performs inverse frequency transform on the frequency coefficients so as to transform them into difference pixel values, and outputs the resulting values to the addition unit 108. The addition unit 108 adds difference pixel values to the predicted image values outputted from the motion compensation unit 102 so as to obtain a decoded picture. The variable length coding unit 110 applies variable length coding to the quantized values, motion vectors, transform size flags, ABT flags, ABT modes and the like so as to output a coded stream.

Next, a description is given as to the operations of the video coding apparatus 100 structured as mentioned above.

Figure 2:
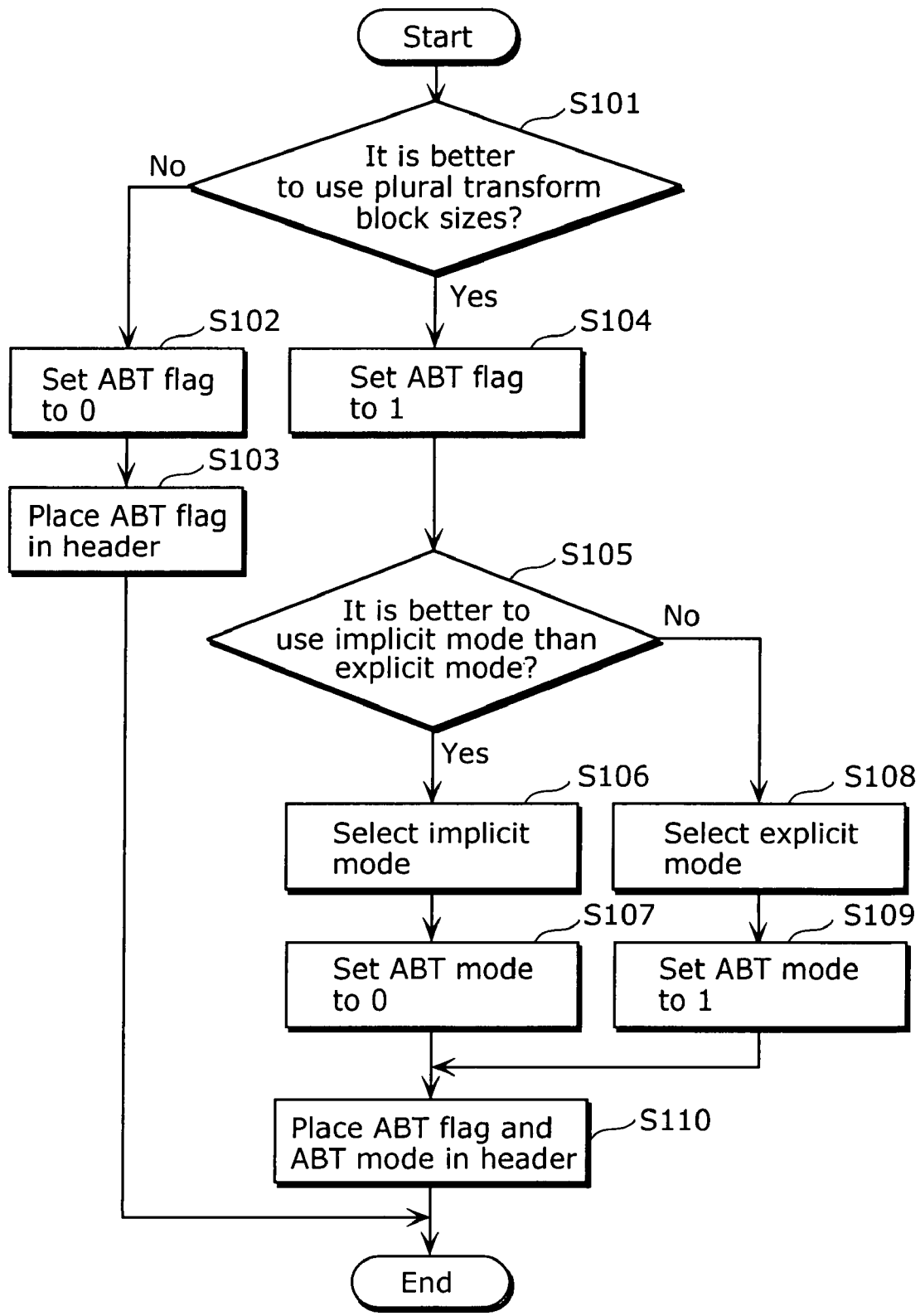
FIG. 2 is a flowchart which shows a sequence of operations for determining a method for notifying a transform block size in the video coding apparatus.

FIG. 2 is a flowchart which shows a sequence of operations for determining the mode in the video coding apparatus 100.

The mode determination unit 111 determines whether or not it is better to perform orthogonal transform using plural transform block sizes (Step S101). Here, in the case where the mode determination unit 111 determines that it is better to perform orthogonal transform without using plural transform block sizes, namely, adaptive block transform is not to be applied (No in Step S101), it sets the ABT flag to "0" (Step S102). Then, the mode determination unit 111 outputs the ABT flag to the variable length coding unit 110 (Step S103). Since plural transform block sizes are not used in this case, orthogonal transform is performed using one predetermined transform block size in a fixed manner. For example, in the case where almost all macroblocks in a picture each use a fixed transform block size, there is no need to apply adaptive block transform and thus the ABT flag is set to "0".

On the other hand, in the case where the mode determination unit 111 determines that it is better to perform orthogonal transform using plural transform block sizes, namely, adaptive block transform is to be applied (Yes in Step S101), it sets the ABT flag to "1" (Step S104). Next, the mode determination unit 111 determines whether or not, as a method for notifying a transform block size for each macroblock, the implicit mode in which a transform block size is determined based on a motion compensation block size used for motion compensation of a current block is better than the explicit mode in which a transform size flag indicating a transform block size is added on a macroblock basis (Step S105). In this determination, it can be determined that the implicit mode is better if priority is given to immediacy because less amount of processing is desired, while the explicit mode is better if priority is given to image quality even if a large amount of processing is required therefor. It can also be determined that the implicit mode is better if the bit rate of a coded stream is low, while the explicit mode is better if the bit rate of a coded stream is high. This is because the increase in the number of bits for transform size flags added to respective macroblocks has a small impact on the increase in the number of bits for a coded scream as a whole, if the bit rate of the coded stream is high.

When the mode determination unit 111 determines that the implicit mode is better as a result of the determination (Yes in Step S105), it selects the implicit mode (Step S106), and sets the ABT mode to "0" (Step S107). In this case, the transform block size is determined by the selected implicit mode. On the other hand, when the mode determination unit 111 determines that the explicit mode is better (No in Step S105), it selects the explicit mode (Step S108), and sets the ABT mode to "1" (Step S109). In this case, the transform block size is determined by the selected explicit mode. Then, the mode determination unit 111 outputs the ABT flag and the ABT mode to the variable length coding unit 110 (Step S110).

Next, a description is given as to the operations for determining a transform block size for a macroblock using the implicit mode. First, a description is given as to the basic operations for determining a transform block size based on a motion compensation block size used for motion compensation of a current macroblock, and next, a description is given as to the specific operations thereof.

Figure 3:
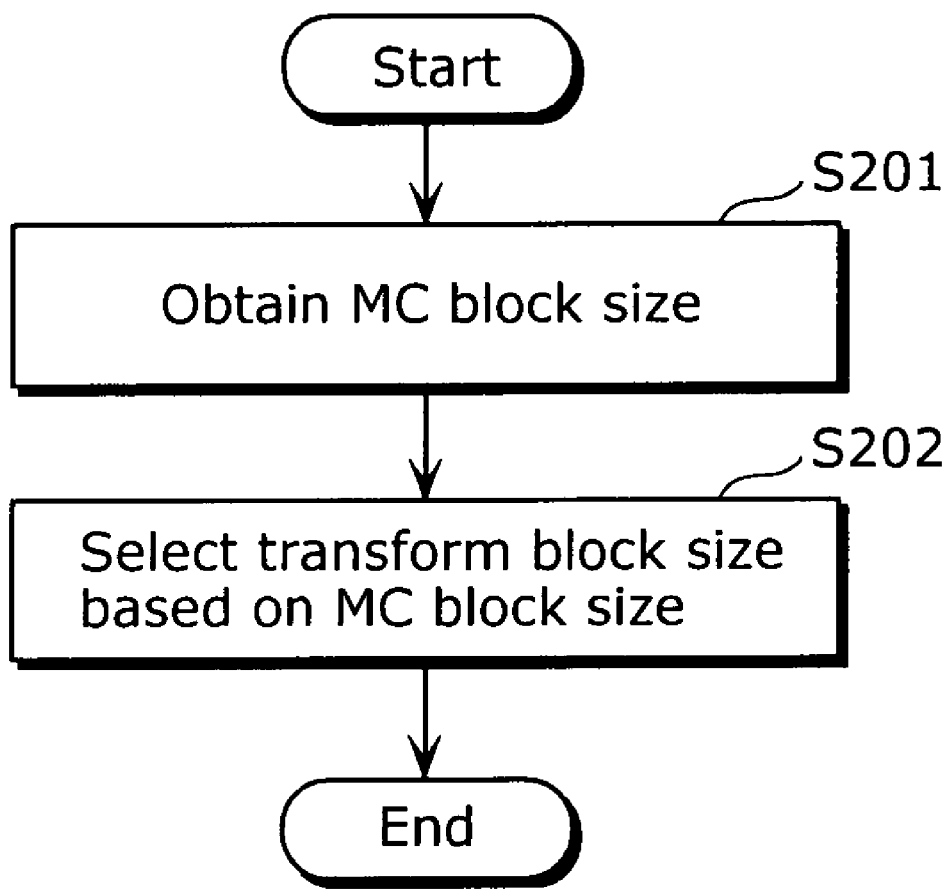
FIG. 3 is a flowchart which shows a sequence of basic operations for determining a transform block size based on a motion compensation block size.

FIG. 3 is a flowchart which shows a sequence of basic operations for determining a transform block size based on a motion compensation block size.

The mode determination unit 111 obtains the most appropriate motion compensation block size (with the least motion compensation difference and the smallest number of bits required for coding the motion compensation information) from among plural motion compensation block sizes used on a macroblock basis (Step S201). Next, the mode determination unit 111 selects the transform block size based on the motion compensation block size (Step S202).

Figure 4:
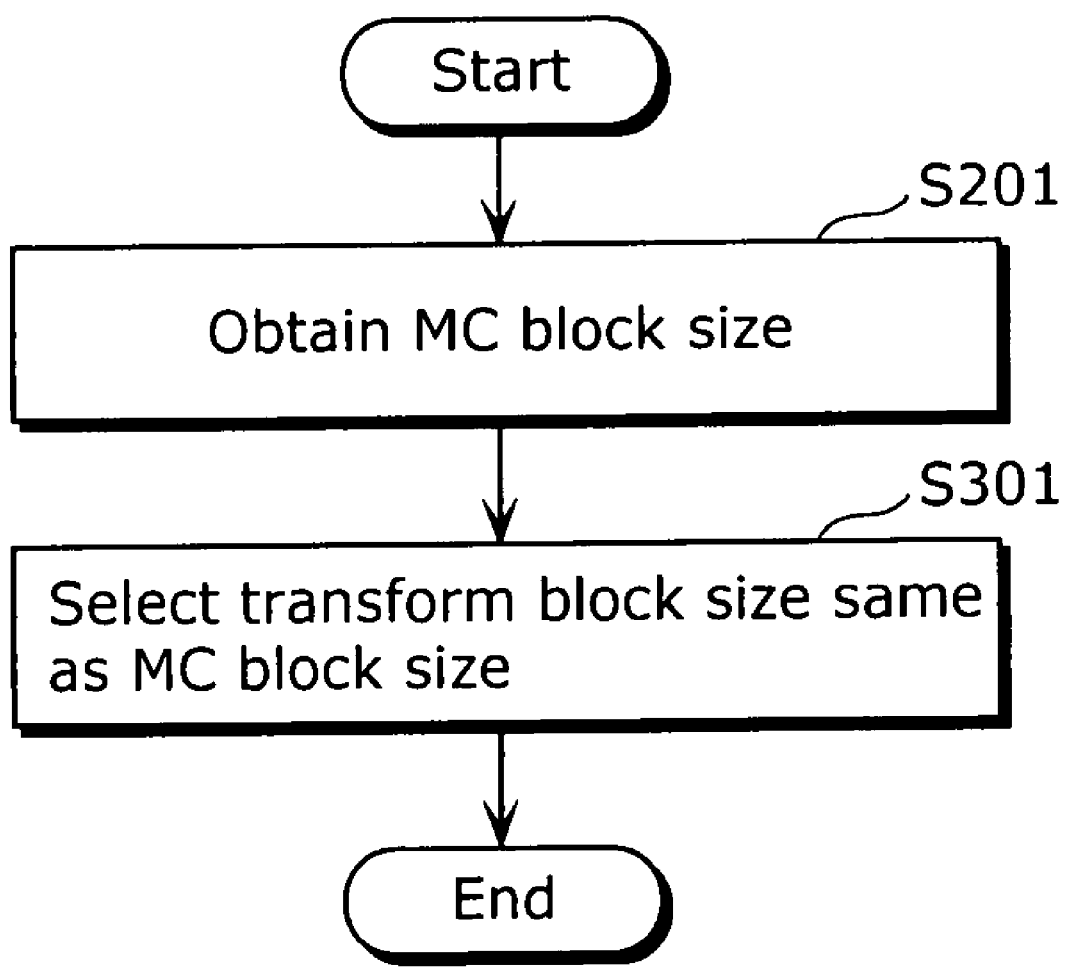
FIG. 4 is a flowchart which shows a specific example of a sequence of operations for determining a transform block size based on a motion compensation block size.

FIG. 4 is a flowchart which shows a specific example of a sequence of operations for determining a transform block size based on a motion compensation block size.

The mode determination unit 111 obtains the motion compensation block size used for motion compensation (Step S201). Next, the mode determination unit 111 selects the transform block size which is the same as the motion compensation block size (Step S301). For example, a transform block size of 4×8 is selected when a motion compensation block size is 4×8.

Figure 5:
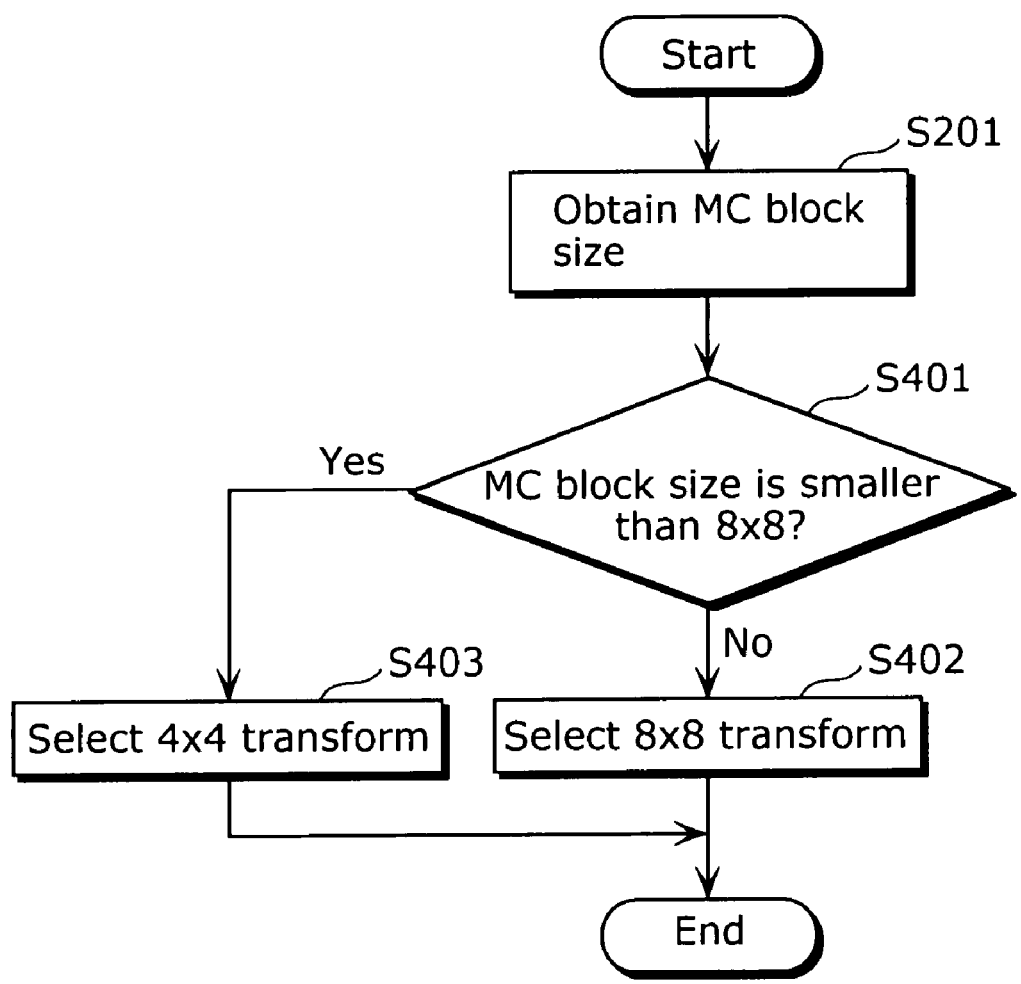
FIG. 5 is a flowchart which shows another specific example of a sequence of operations for determining a transform block size based on a motion compensation block size.

FIG. 5 is a flowchart which shows another specific example of a sequence of operations for determining a transform block size based on a motion compensation block size. It is assumed here that only two types of transform block sizes, i.e., 8×8 and 4×4, are supported.

The mode determination unit 111 obtains the motion compensation block size used for motion compensation (Step S201). Next, the mode determination unit 111 determines whether or not the motion compensation block size is smaller than 8×8 (Step S401). When the motion compensation block size is not smaller than 8×8 as a result of this determination (No in Step S401), the mode determination unit 111 selects 8×8 as a transform block size (Step S402). On the other hand, when the motion compensation block size is smaller than 8×8 (Yes in Step S401), the mode determination unit 111 selects 4×4 as a transform block size (Step S403).

Next, a description is given as to the operations for determining a transform block size for a macroblock using the explicit mode. First, the basic operations for determining a transform block size are described, and then specific operations are described.

Figure 6:
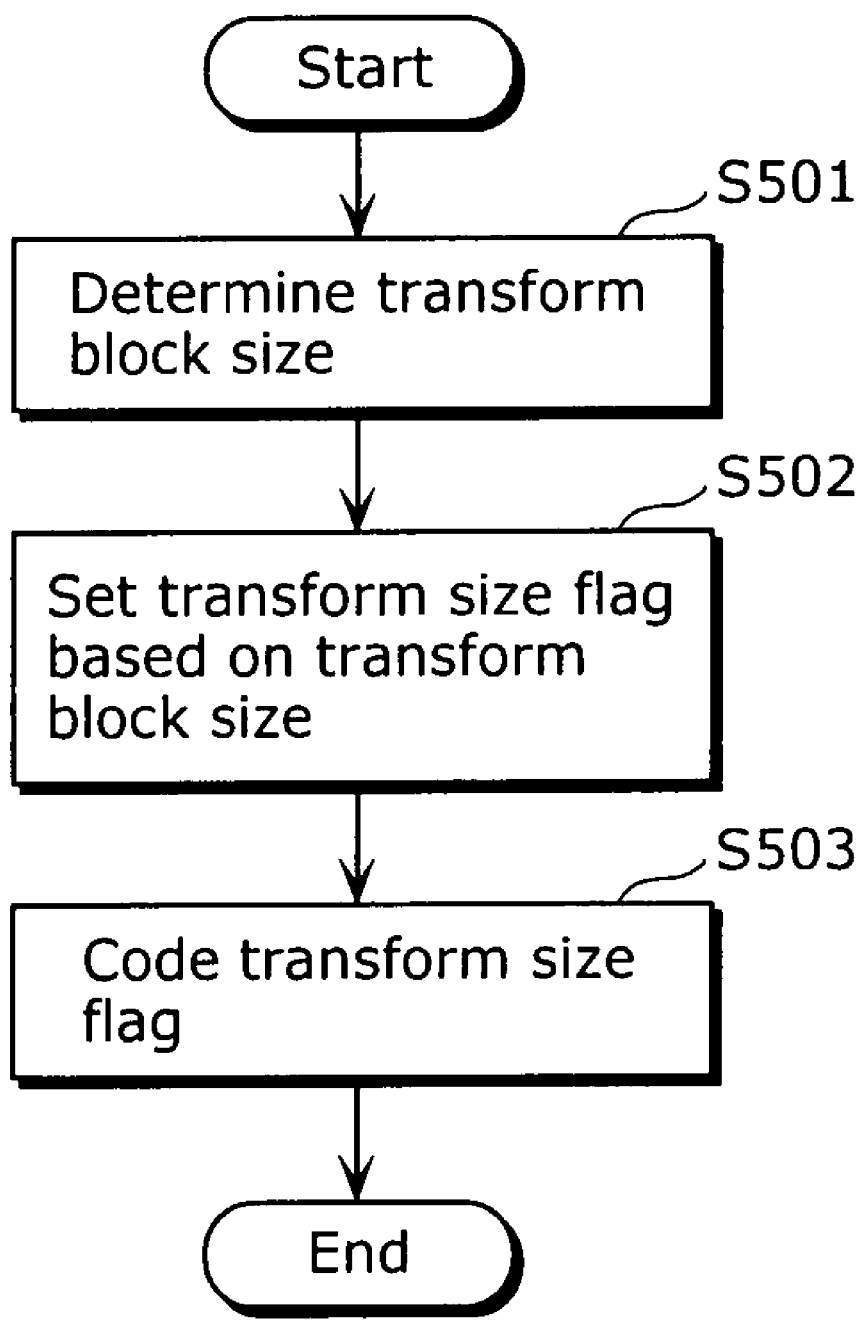
FIG. 6 is a flowchart which shows a sequence of basic operations for determining a transform block size.

FIG. 6 is a flowchart which shows a sequence of basic operations for determining a transform block size.

The mode determination unit 111 determines the transform block size for a current macroblock (Step S501). Next, the mode determination unit 111 sets a transform size flag based on the determined transform block size (Step S502). Then, the mode determination unit 111 outputs the transform size flag to the variable length coding unit 110 (Step S503).

Figure 7:
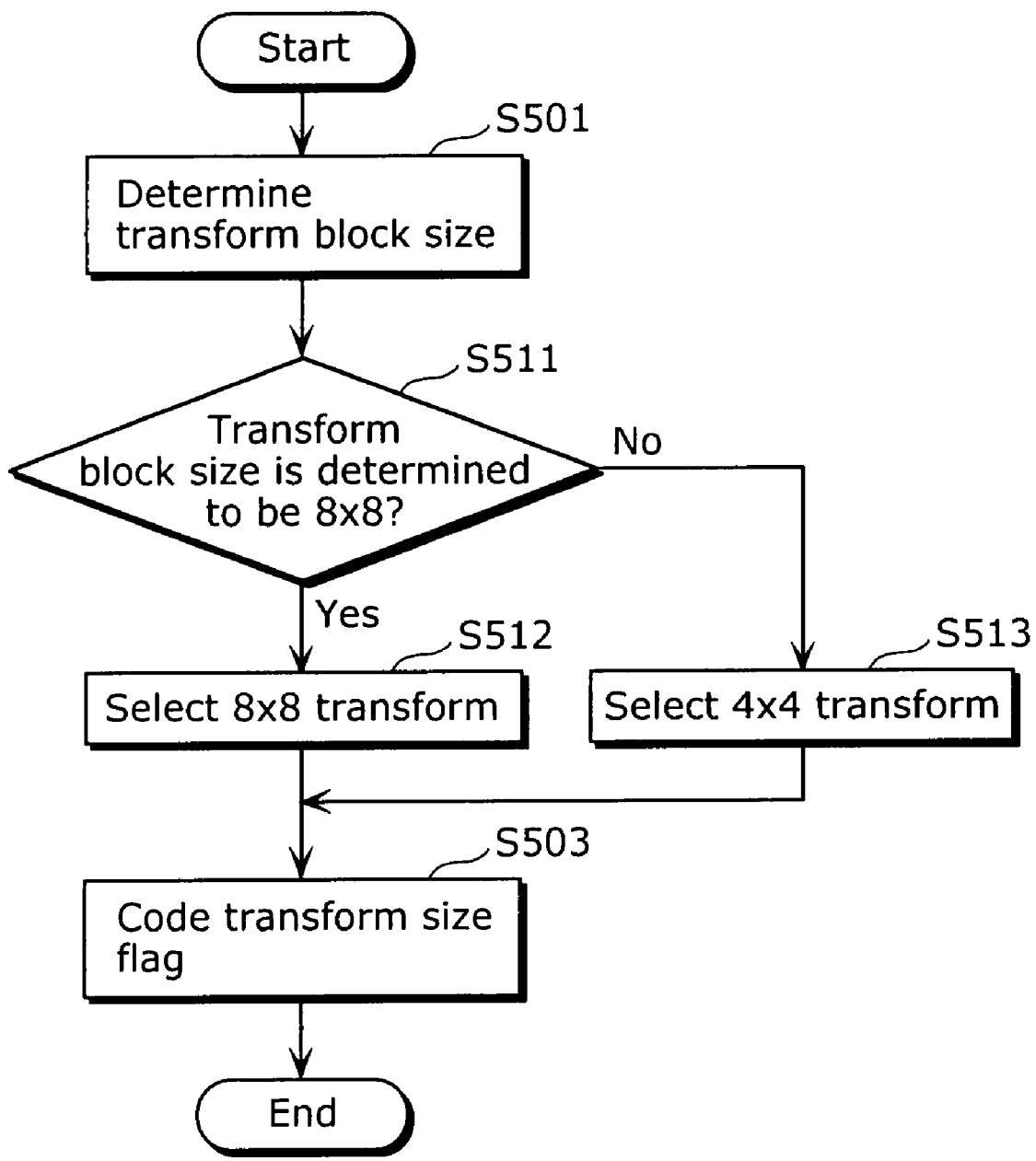
FIG. 7 is a flowchart which shows a specific example of a sequence of operations for determining a transform block size.

FIG. 7 is a flowchart which shows a specific example of a sequence of operations for determining a transform block size. It is assumed here that only two types of transform block sizes, i.e., 8×8 and 4×4, are supported.

The mode determination unit 111 determines the transform block size for a current macroblock (Step S501). Next, the mode determination unit 111 judges whether or not the transform block size is determined to be 8×8 (Step S511). As a result of the judgment, the transform block size is determined to be 8×8 (Yes in Step S511), the mode determination unit 111 selects 8×8 as a transform block size and sets the transform size flag to 8×8 (Step S512). On the other hand, the transform block size is not determined to be 8×8 (No in Step S511), the mode determination unit 111 selects 4×4 as a transform block size and sets the transform size flag to 4×4 (Step S513). Then, the mode determination unit 111 outputs the transform size flag to the variable length coding unit 110 (Step S503).

Figure 8:
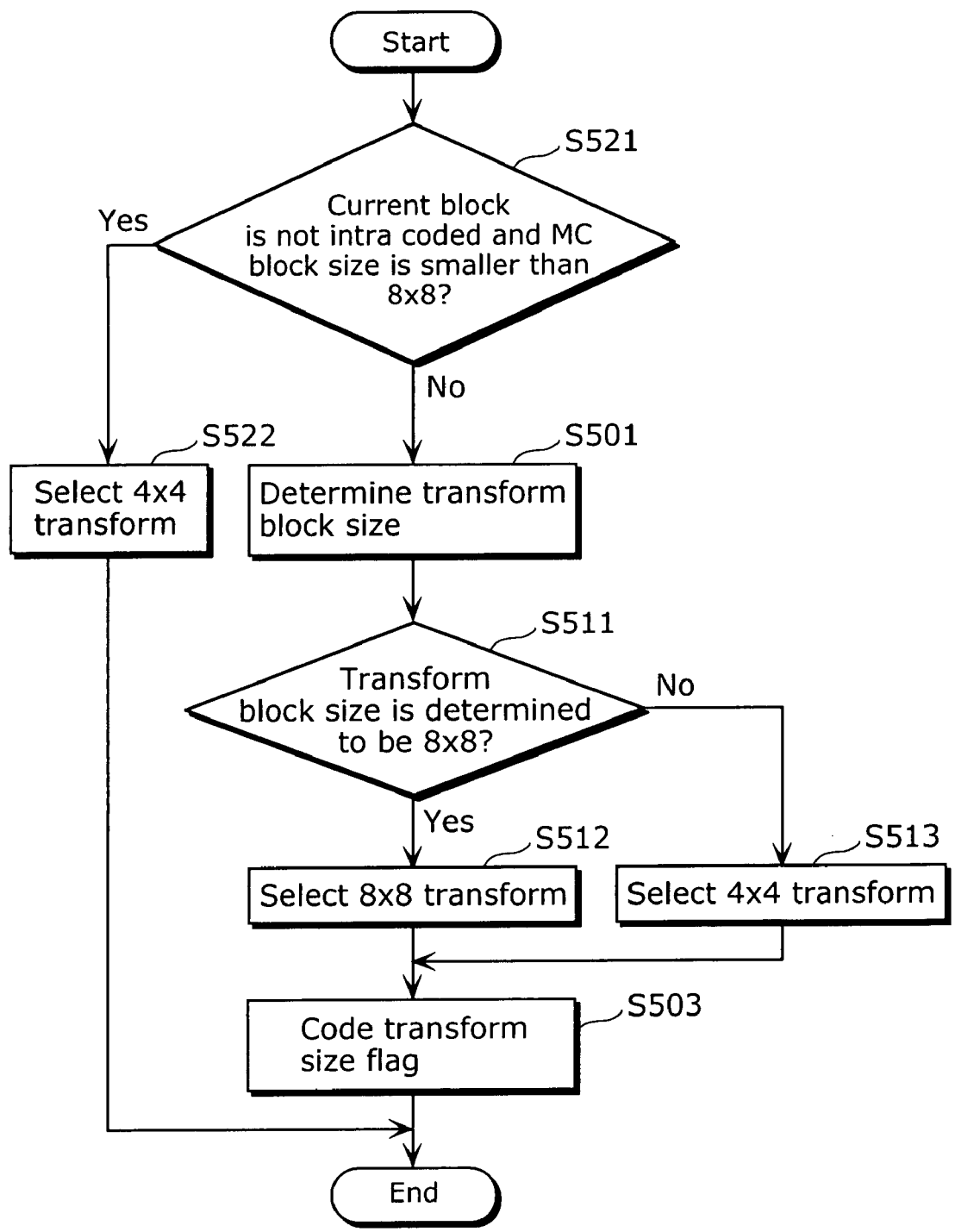
FIG. 8 is a flowchart which shows another specific example of a sequence of operations for determining a transform block size.

FIG. 8 is a flowchart which shows another specific example of a sequence of operations for determining a transform block size.

The mode determination unit 111 judges whether or not a current block is not intra coded (intra-picture coded) and the motion compensation block size is smaller than 8×8 (Step S521). As a result of the judgment, when the current block is not intra coded and the motion compensation block size is smaller than 8×8 (Yes in Step S521), the mode determination unit 111 selects 4×4 as a transform block size (Step S522). It is used for the judgment whether the current block is intra coded or not, because motion compensation is not performed for such an intra coded block and thus the motion compensation block size cannot be obtained. On the other hand, when the current block is intra coded or the motion compensation block size is not smaller than 8×8 (No in Step S521), the mode determination unit 111 determines the transform block size for the current macroblock (Step S501). Next, the mode determination unit 111 judges whether or not the transform block size is determined to be 8×8 (Step S511). As a result of the judgment, the transform block size is determined to be 8×8 (Yes in Step S511), the mode determination unit 111 selects 8×8 as a transform block size and sets the transform size flag to 8×8 (Step S512). On the other hand, the transform block size is not determined to be 8×8 (No in Step S511), the mode determination unit 111 selects 4×4 as a transform block size and sets the transform size flag to 4×4 (Step S513). Then, the mode determination unit 111 outputs the transform size flag to the variable length coding unit 110 (Step S503).

Figure 9:
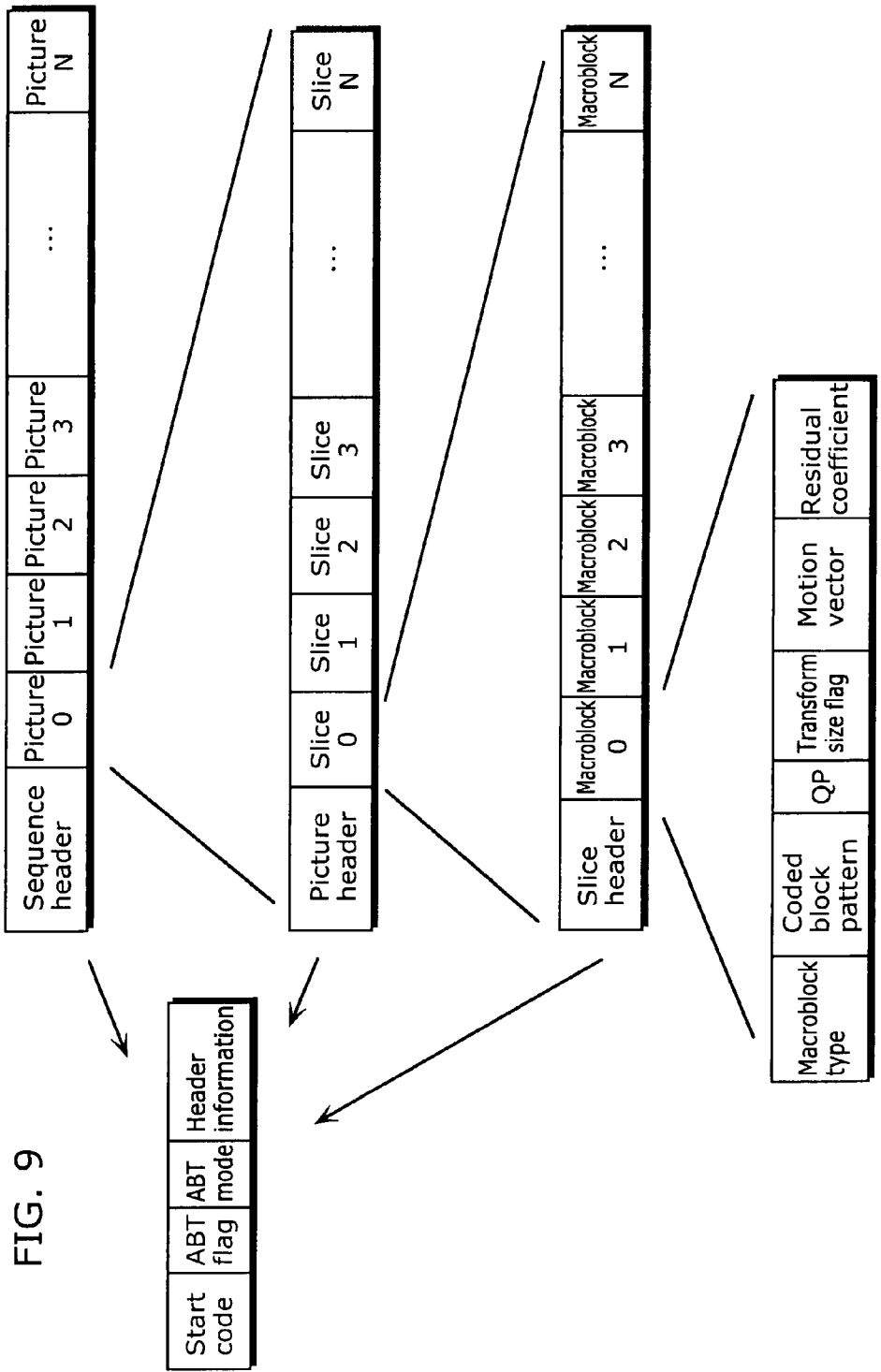
FIG. 9 is a diagram which shows the locations of an ABT flag, an ABT mode and a transform size flag in a coded stream.

FIG. 9 is a diagram which shows the locations of an ABT flag, an ABT mode and a transform size flag in a coded stream. As shown in FIG. 9, if an ABT flag and an ABT mode are present, they are stored in the header of each slice, each picture or each sequence. Or, the ABT flag and the ABT mode are sometimes stored in plural headers, for example, in the case where a parameter in the lower layer such as a slice header overwrites the meaning of a parameter in the higher layer such as a sequence header. A transform size flag is stored in a macroblock layer. In FIG. 9, the ABT flag and the ABT mode are stored immediately after the start code. It should be noted, however, that other information may be stored after the start code but before the ABT flag and the ABT mode.

As described above, the implicit mode or the explicit mode can be selectively used as a method for notifying the transform block size for each sequence, each picture or each slice. Therefore, it is possible to enhance the coding efficiency and improve the video quality.

A description is given above as to the method for determining a transform block size based on a motion compensation block size, as the implicit mode. It should be noted, however, that the present invention is not limited to this method. For example, a transform block size may be determined based on the motion vectors of blocks adjacent to a current block, or may be determined based on the quantization parameter of a current block.

Figure 10A:
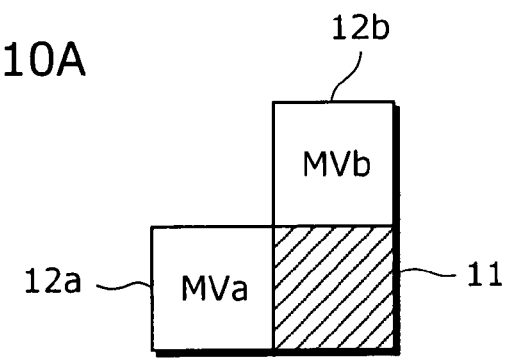
FIG. 10A is a diagram for explaining motion vectors of adjacent blocks.
Figure 10B:
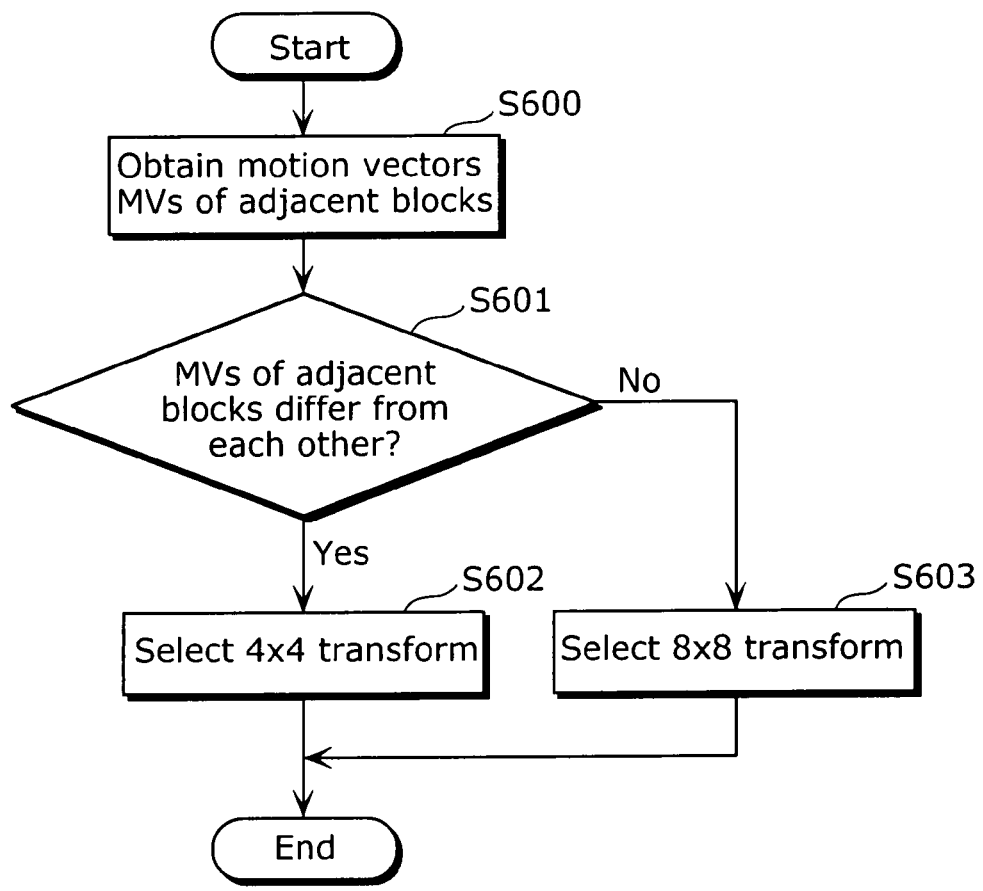
FIG. 10B is a flowchart which shows a sequence of operations for determining a transform block size based on the motion vectors of the adjacent blocks.

FIG. 10A is a diagram for explaining motion vectors of adjacent blocks, and FIG. 10B is a flowchart which shows a sequence of operations for determining a transform block size based on the motion vectors of adjacent blocks.

The mode determination unit 111 obtains the motion vectors of blocks adjacent to a current block (Step S600). For example, the mode determination unit 111 obtains, as the motion vectors of the adjacent blocks, the motion vector MVa of a block 12a located left of the current block 11 and the motion vector MVb of a block 12b located above the current block 11. Next, the mode determination unit 111 judges whether or not the motion vectors of the adjacent blocks differ from each other (Step S601). Here, as to whether or not the motion vectors of the adjacent blocks differ from each other, it can be judged that they differ when the value of MVa -MVb is greater than or equal to a predetermined threshold value. As a result of this judgment, when the motion vectors of the adjacent blocks differ from each other (Yes in Step S601), the motion determination unit 111 selects a smaller transform block size, for example, 4×4 (Step S602). On the other hand, when the motion vectors of the adjacent blocks do not differ from each other (No in Step S601), the motion determination unit 111 selects a larger transform block size, for example, 8×8 (Step S603).

It shows that a current block includes complicated motions (in various directions) when the motion vectors of the adjacent blocks differ from each other. Therefore, by selecting a small transform block size, the motion compensation difference can be coded faithfully.

Figure 11:
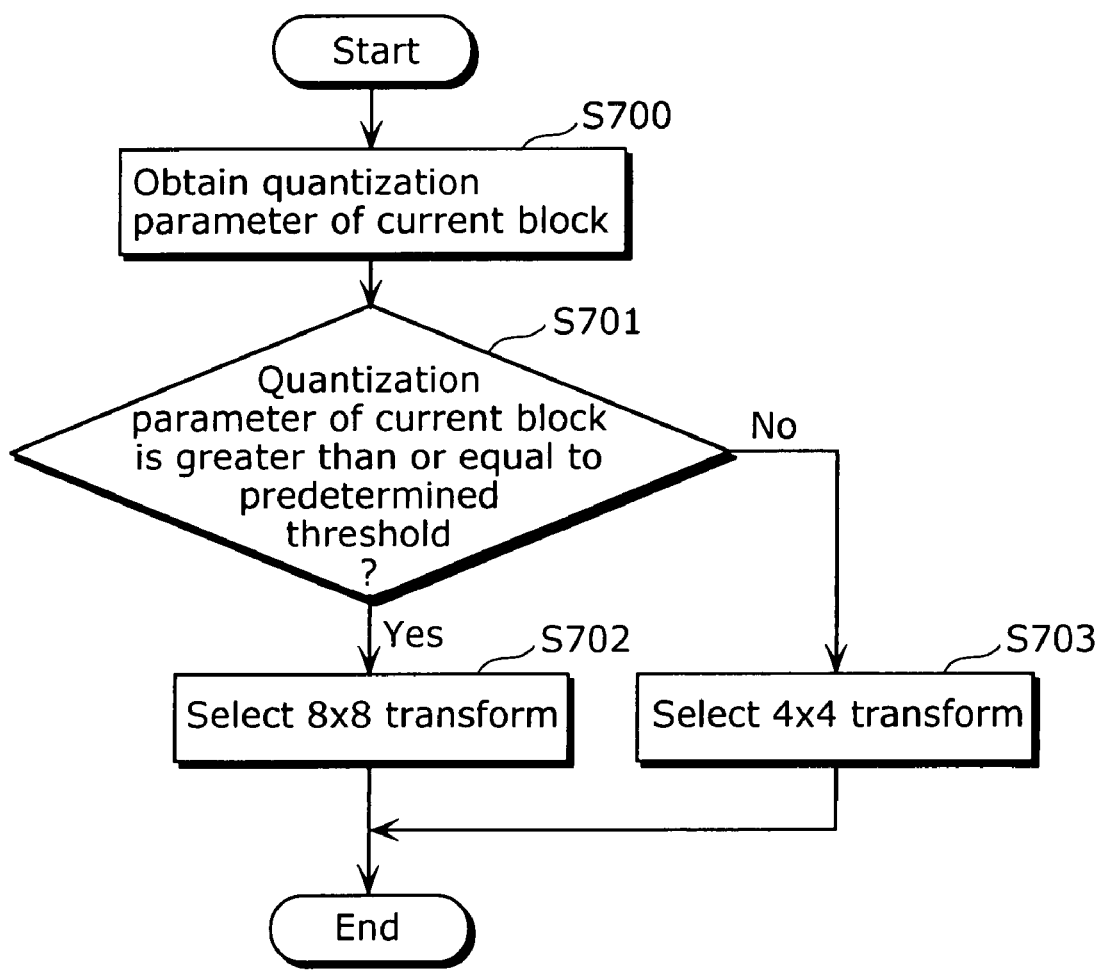
FIG. 11 is a flowchart which shows a sequence of operations for determining a transform block size based on a quantization parameter.

FIG. 11 is a flowchart which shows a sequence of operations for determining a transform block size based on a quantization parameter.

The mode determination unit 111 obtains the quantization parameter of a current block (Step 5700). Next, the mode determination unit 111 judges whether or not the quantization parameter is a predetermined threshold value (Step S701). As a result of this judgment, when the quantization parameter is greater than or equal to the predetermined threshold value (Yes in Step S701), the motion determination unit 111 selects a larger transform block size, for example, 8×8 (Step S702). On the other hand, when the quantization parameter is less than the predetermined threshold value (No in Step S701), the motion determination unit 111 selects a smaller transform block size, for example, 4×4 (Step S703).

In the case where the quantization parameter has a great value (quantization step size is large), it is often necessary to reduce the number of bits to increase the compression ratio. Therefore, by selecting a large transform block size, the number of bits can be reduced after coding.

Figure 12:
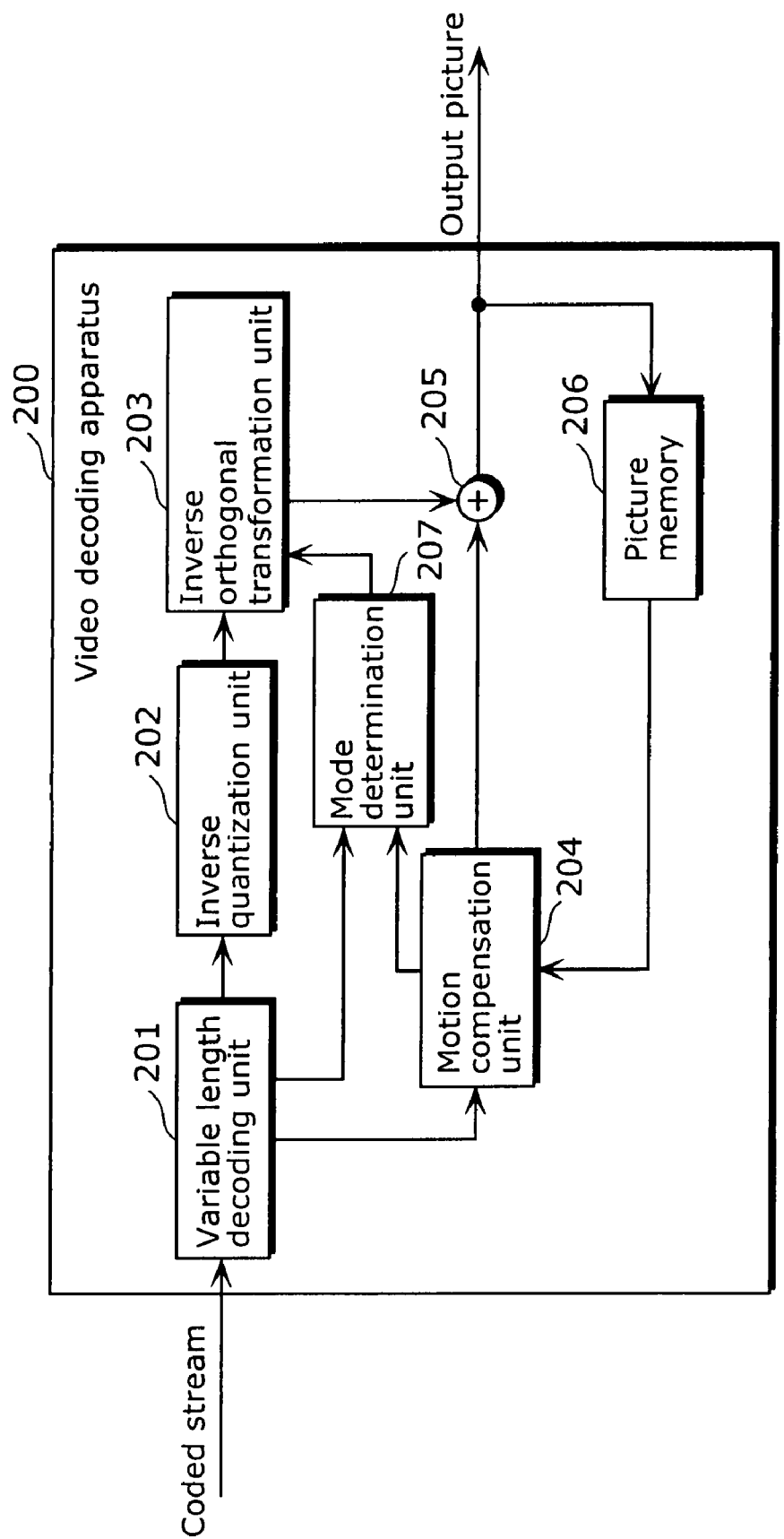
FIG. 12 is a block diagram which shows a structure of a video decoding apparatus in the embodiment of the present invention.

FIG. 12 is a block diagram which shows a structure of a video decoding apparatus in the embodiment of the present invention.

A video decoding apparatus 200 is an apparatus for decoding an input coded stream on a block-by-block basis and outputting pictures, and includes, as shown in FIG. 12, a variable length decoding unit 201, an inverse quantization unit 202, an inverse orthogonal transformation unit 203, a motion compensation unit 204, an addition unit 205, a picture memory 206, and a mode determination unit 207.

The variable length decoding unit 201 decodes a coded stream and outputs the quantization values to the inverse quantization unit 202 and the motion vectors and the like to the motion compensation unit 204, respectively. The variable length decoding unit 201 analyzes the header of the coded stream and outputs the ABT flag and the ABT mode to the mode determination unit 207. Note that this header may be a slice header, a picture header or a sequence header. The motion compensation unit 204 extracts the best image area for a predicted image from a decoded picture stored in the picture memory 206 using the motion vectors inputted from the variable length decoding unit 201, so as to generate the predicted image.

The mode determination unit 207 judges, based on the ABT flag, whether the adaptive block transform is applied or not. In the case where the adaptive block transform is applied, the mode determination unit 207 identifies, based on the ABT mode, a notification method of a transform block size used in orthogonal transform of a current block. More specifically, the mode determination unit 207 identifies which method is used as a notification method, the implicit mode or the explicit mode. Further, the mode determination unit 207 determines the transform block size notified by the implicit mode or the explicit mode.

The inverse quantization unit 202 inversely quantizes the inputted quantized values so as to reconstruct frequency coefficients, and outputs the resulting coefficients to the inverse orthogonal transformation unit 203. The inverse orthogonal transformation unit 203 performs inverse frequency transform on the frequency coefficients to transform them into difference pixel values based on the transform block size determined in accordance with the notification method determined by the mode determination unit 207, and outputs the resulting values to the addition unit 205. The addition unit 205 adds the difference pixel values to the predicted image values outputted from the motion compensation unit 204 so as to obtain a decoded picture.

Next, a description is given as to the operations of the moving picture coding apparatus 200 structured as mentioned above.

Figure 13:
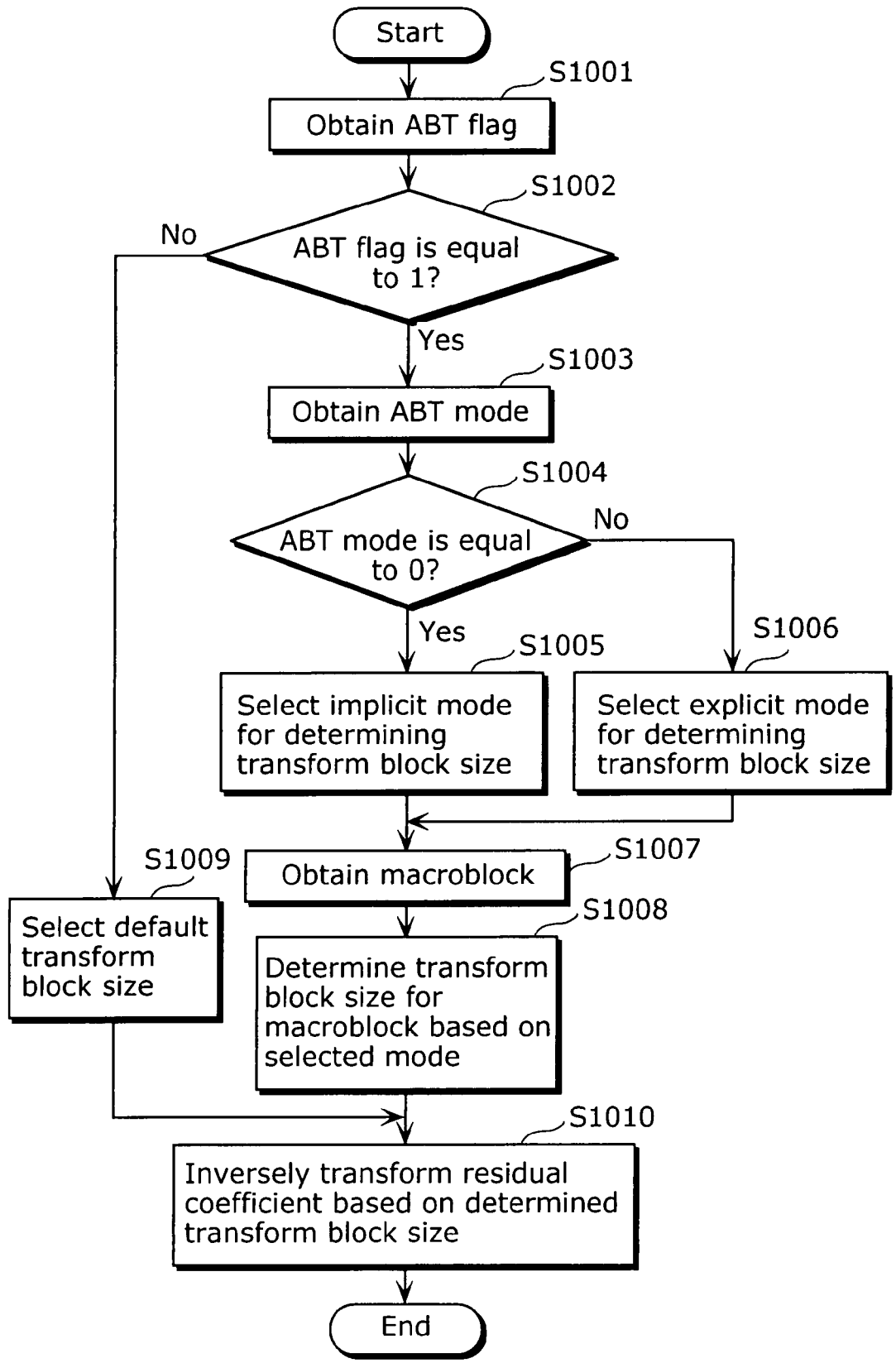
FIG. 13 is a flowchart which shows a sequence of operations for identifying a notification method for notifying a transform block size in the video decoding apparatus.

FIG. 13 is a flowchart which shows a sequence of operations for identifying the mode in the video decoding apparatus 200.

The mode determination unit 207 obtains an ABT flag (Step S1001). Next, the mode determination unit 207 judges whether or not the ABT flag is equal to "1", namely, whether or not the adaptive block transform is applied (Step S1002). As a result of this judgment, when the adaptive block transform is applied (Yes in Step S1002), the mode determination unit 207 obtains the ABT mode (Step S1003). Note that the mode determination unit 207 may also obtain the ABT mode, assuming that the adaptive block transform is applied even if the ABT flag is not present. Next, the mode determination unit 207 judges whether or not the ABT flag is equal to "0", namely, whether the implicit mode is used or the explicit mode is used (Step S1004). As a result of this judgment, when the ABT mode is equal to "0" (Yes in Step S1004), the mode determination unit 207 identifies that the implicit mode is used, and selects the implicit mode (Step S1005). On the other hand, when the ABT mode is not equal to "0" (No in Step S1004), the mode determination unit 207 identifies that the explicit mode is used, and selects the explicit mode (Step S1006). Next, the mode determination unit 207 obtains a macroblock (step S1007), and determines the transform block size for the macroblock in accordance with the selected implicit mode or explicit mode (Step S1008). When selecting the transform block size in accordance with the implicit mode, the mode determination unit 207 selects the transform block size which is the same as that selected by the video coding apparatus using the method shown in FIG. 3, FIG. 4, FIG. 5, FIG. 8, FIG. 10, FIG. 11, or the like.

On the other hand, when the adaptive block transform is not applied (No in Step S1002), the mode determination unit 207 determines the transform block size for a macroblock to be a predetermined transform block size (Step S1009). Note that this predetermined transform block size is the most commonly used block size.

In the last step, the inverse orthogonal transformation unit 203 performs inverse frequency transform on the frequency coefficients of the macroblock to transform them into the difference pixel values based on the transform block size determined as mentioned above (Step S1010).

Since the operations for determining a transform block size for a macroblock using the implicit mode are the same as those of the video coding apparatus 100, a description thereof is not repeated here.

Next, a description is given as to the operations for determining a transform block size for a macroblock using the explicit mode. First, the basic operations for determining a transform block size based on a transform size flag for each macroblock are described, and then specific operations are described.

Figure 14:
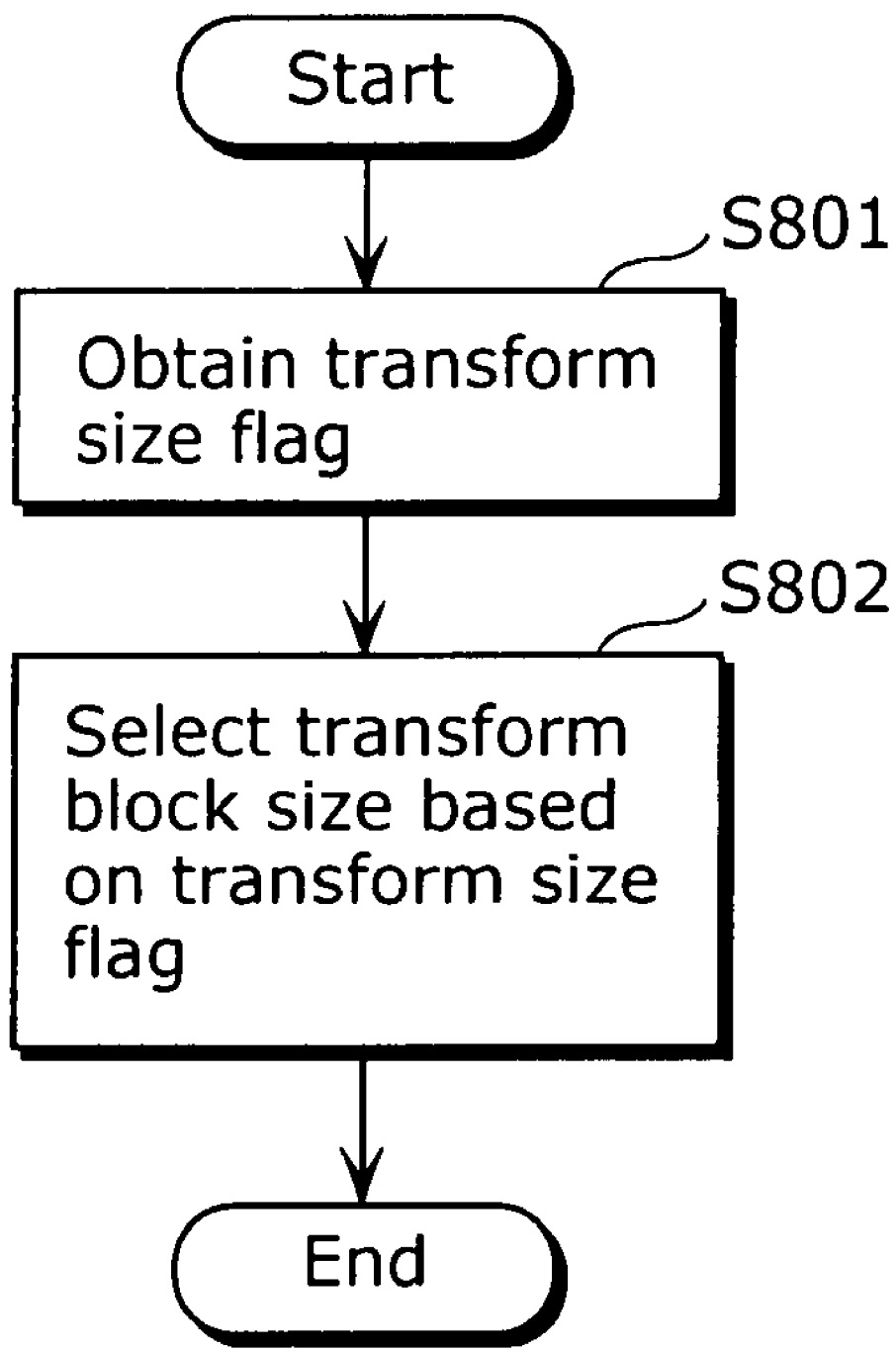
FIG. 14 is a flowchart which shows a sequence of basic operations for determining a transform block size based on a transform size flag.

FIG. 14 is a flowchart which shows a sequence of operations for determining a transform block size based on a transform size flag.

The mode determination unit 207 obtains a transform size flag for a current macroblock (Step S801). Next, the mode determination unit 207 selects a transform block size based on the transform size flag (Step S802).

Figure 15:
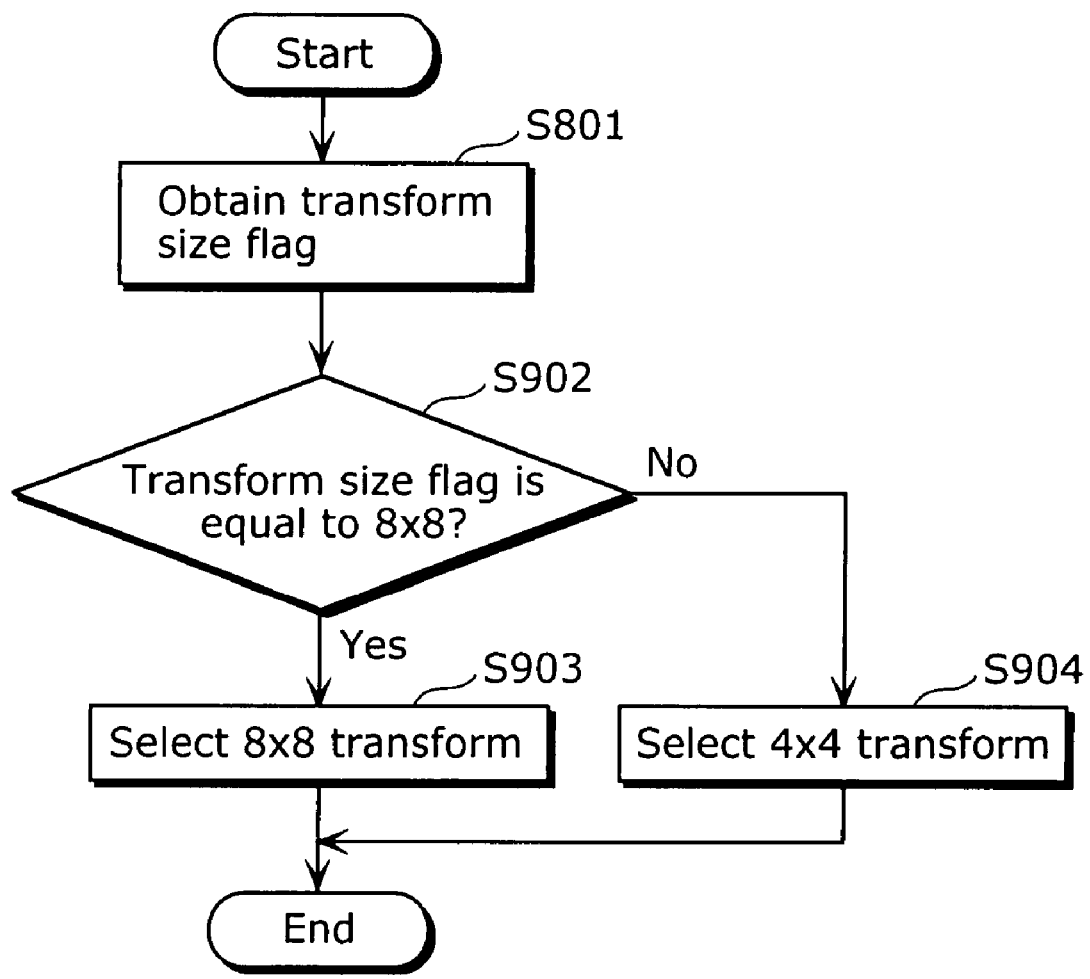
FIG. 15 is a flowchart which shows a specific example of a sequence of operations for determining a transform block size based on a transform size flag.

FIG. 15 is a flowchart which shows a specific example of a sequence of operations for determining a transform block size based on a transform size flag. It is assumed here that only two types of transform block sizes, i.e., 8×8 and 4×4, are supported.

The mode determination unit 207 obtains a transform size flag for a current macroblock (Step S801). Next, the mode determination unit 207 judges whether or not the transform size flag indicates 8×8 (Step S902). As a result of this judgment, when the transform size flag indicates 8×8 (Yes in Step S902), the mode determination unit 207 selects 8×8 as a transform block size (Step S903). On the other hand, when the transform size flag does not indicate 8×8 (No in Step S902), the mode determination unit 207 selects 4×4 as a transform block size (Step S904).

Figure 16:
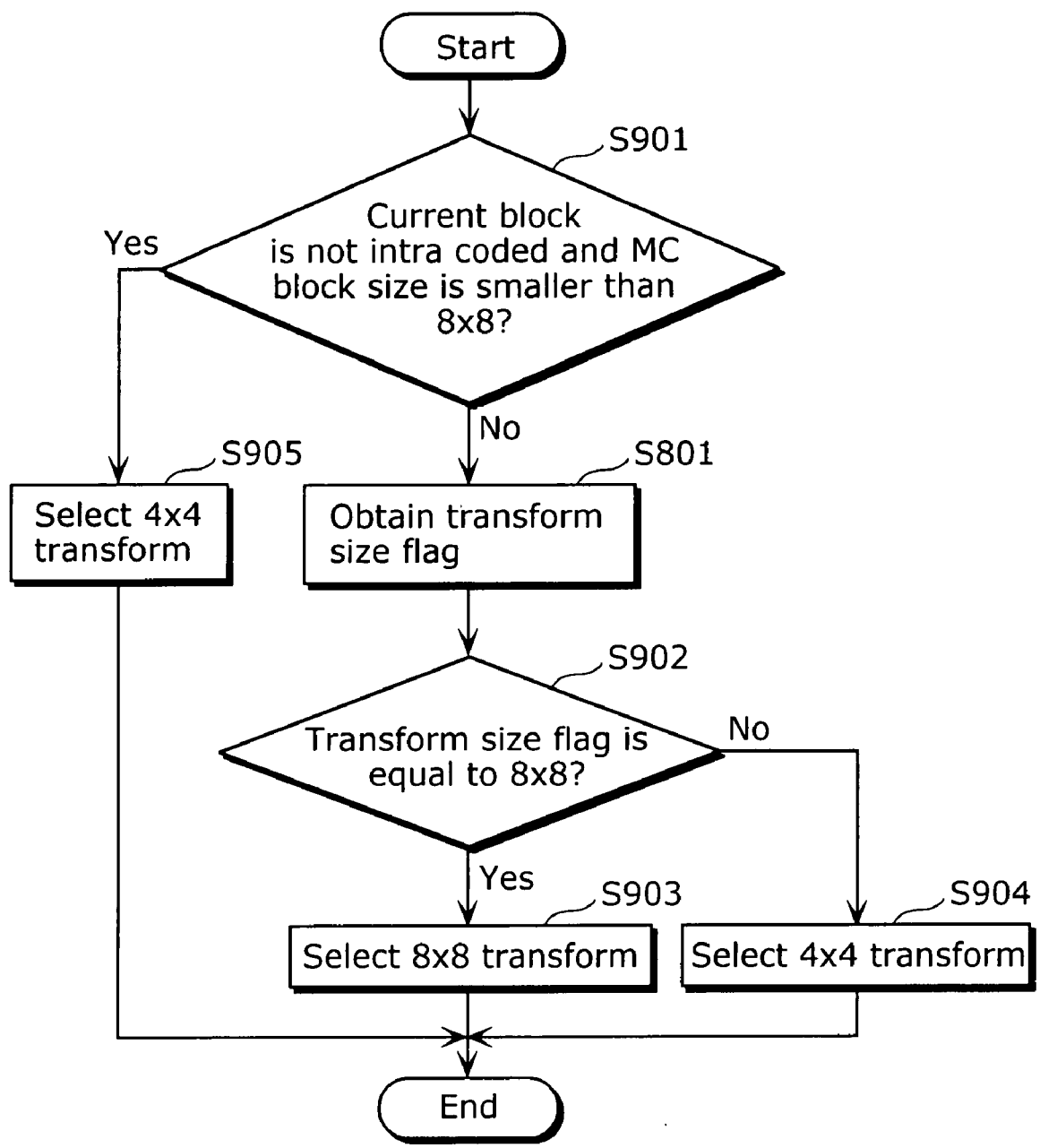
FIG. 16 is a flowchart which shows another specific example of a sequence of operations for determining a transform block size based on a transform size flag.

FIG. 16 is a flowchart which shows another specific example of a sequence of operations for determining a transform block size based on a transform size flag.

The mode determination unit 207 judges whether or not a current block is not intra coded (intra-picture coded) and a motion compensation block size is smaller than 8×8 (Step S901). As a result of the judgment, if the current block is not intra coded and the motion compensation block size is smaller than 8×8 (Yes in Step S901), the mode determination unit 207 selects 4×4 as a transform block size (Step S905). It is used for the judgment whether the current block is intra coded or not, because motion compensation is not performed for such an intra coded block and thus the motion compensation block size cannot be obtained. On the other hand, if the current block is intra coded or the motion compensation block size is not smaller than 8×8 (No in Step S901), the mode determination unit 207 obtains the transform size flag for the current macroblock (Step S801). Next, the mode determination unit 207 judges whether or not the transform size flag indicates 8×8 (Step S902). As a result of this judgment, when the transform size flag indicates 8×8 (Yes in Step S902), the mode determination unit 207 selects 8×8 as a transform block size (Step S903). On the other hand, when the transform size flag does not indicate 8×8 (No in Step S902), the mode determination unit 207 selects 4×4 as a transform block size (Step S904).

As described above, it is possible to identify a notification method of a transform block size and determine the transform block size based on information in a coded stream indicating the implicit mode or the explicit mode selectively used for each sequence, each picture, or each slice.

Each functional block in the block diagrams shown in FIG. 1 and FIG. 12 is realized as an LSI which is typically an integrated circuit. Each of these blocks can be in plural single-function LSIs, or also can be in one integrated LSI including a part or all of these functions (For example, the functional blocks other than a memory may be integrated into one chip).

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSI or a reconfigurable processor that allows reconfiguration of the connection or setup of circuit cells inside the LSI can be used for the same purpose.

In the future, with advancement in semiconductor technology or another technology derived therefrom, a brand-new integration technology may replace LSI. The integration can be carried out by that technology. Application of biotechnology is one such possibility.

Industrial Applicability

The video coding method and the video decoding method according to the present invention can be applied to all kinds of multimedia data, and allow enhancement of coding efficiency as well as improvement in video quality. For example, these methods are useful as a video coding method and a video decoding method in storage, transmission, communication, and the like using cellular phones, DVD devices, personal computers, and the like.

The invention claimed is:

1. A video coding method for coding an input picture on a block-by-block basis so as to generate a coded stream, said method comprising:
  determining, using a processor, a notification method for notifying a transform block size to be used in an orthogonal transform of a current block;
  creating an adaptive block transform mode indicating the notification method;
  generating the coded stream; and
  adding the adaptive block transform mode to the coded stream;
  wherein said determining includes determining, as the notification method, either (i) an implicit mode in which the transform block size is determined based on information regarding the current block or (ii) an explicit mode in which a transform size flag indicating the transform block size is added to each predetermined unit of blocks, and
  wherein in the implicit mode, the transform block size is determined based on motion vectors of blocks adjacent to the current block.

2. The video coding method according to claim 1,
  wherein in the implicit mode, the transform block size is determined to be 4×4 pixels in a case where a degree to which the motion vectors differ from each other is greater than or equal to a predetermined threshold value, and
  wherein in the implicit mode, the transform block size is determined to be 8×8 pixels in a case where the degree to which the motion vectors differ from each other is less than the predetermined threshold value.

3. A video coding method for coding an input picture on a block-by-block basis so as to generate a coded stream, said method comprising:
  determining, using a processor, a notification method for notifying a transform block size to be used in an orthogonal transform of a current block;
  creating an adaptive block transform mode indicating the notification method;
  generating the coded stream; and adding the adaptive block transform mode to the coded stream;
wherein said determining includes determining, as the notification method, either (i) an implicit mode in which the transform block size is determined based on information regarding the current block or (ii) an explicit mode in which a transform size flag indicating the transform block size is added to each predetermined unit of blocks, and
wherein in the implicit mode, the transform block size is determined based on a quantization step used for quantization of the current block.

4. The video coding method according to claim 3,
wherein in the implicit mode, the transform block size is determined to be 8×8 pixels in a case where the quantization step is greater than or equal to a predetermined threshold value, and
wherein in the implicit mode, the transform block size is determined to be 4×4 pixels in a case where the quantization step is less than the predetermined threshold value.

5. The video coding method according to claim 1, further comprising:
determining whether or not to apply an adaptive block transform in which the transform block size to be used in the orthogonal transform of the current block is (i) determined from among a plurality of transform block sizes and (ii) used;
performing said determining of the notification method when it is determined to apply the adaptive block transform;
creating an adaptive block transform flag indicating whether or not to apply the adaptive block transform; and
adding the adaptive block transform flag to the coded stream.

6. The video coding method according to claim 1, further comprising:
determining the transform block size based on the notification method; and
coding the current block by performing the orthogonal transform on the current block using the determined transform block size.

7. A video decoding method for decoding a coded stream on a block-by-block basis, said method comprising:
obtaining, from the coded stream, an adaptive block transform mode indicating a notification method for notifying a transform block size used in an orthogonal transform of a current block;
identifying the notification method based on the adaptive block transform mode;
determining, using a processor, the transform block size based on the identified notification method; and
decoding the current block by performing an inverse orthogonal transform on the current block using the determined transform block size,
wherein the adaptive block transform mode indicates, as the notification method, either (i) an implicit mode in which the transform block size is determined based on information regarding the current block or (ii) an explicit mode in which a transform size flag indicating the transform block size is added to each predetermined unit of blocks, and
wherein in the implicit mode, the transform block size is determined based on motion vectors of blocks adjacent to the current block.

8. The video decoding method according to claim 7,
wherein in the implicit mode, the transform block size is determined to be 4×4 pixels in a case where a degree to which the motion vectors differ from each other is greater than or equal to a predetermined threshold value, and
wherein in the implicit mode, the transform block size is determined to be 8×8 pixels in a case where the degree to which the motion vectors differ from each other is less than the predetermined threshold value.

9. A video decoding method for decoding a coded stream on a block-by-block basis, said method comprising:
obtaining, from the coded stream, an adaptive block transform mode indicating a notification method for notifying a transform block size used in an orthogonal transform of a current block;
identifying the notification method based on the adaptive block transform mode;
determining, using a processor, the transform block size based on the identified notification method; and
decoding the current block by performing an inverse orthogonal transform on the current block using the determined transform block size,
wherein the adaptive block transform mode indicates, as the notification method, either (i) an implicit mode in which the transform block size is determined based on information regarding the current block or (ii) an explicit mode in which a transform size flag indicating the transform block size is added to each predetermined unit of blocks, and
wherein in the implicit mode, the transform block size is determined based on a quantization step used for quantization of the current block.

10. The video decoding method according to claim 9,
wherein in the implicit mode, the transform block size is determined to be 8×8 pixels in a case where the quantization step is greater than or equal to a predetermined threshold value, and
wherein in the implicit mode, the transform block size is determined to be 4×4 pixels in a case where the quantization step is less than the predetermined threshold value.

11. The video decoding method according to claim 7, further comprising:
obtaining an adaptive block transform flag indicating whether or not an adaptive block transform, in which the transform block size to be used in the orthogonal transform of the current block is (i) determined from among a plurality of transform block sizes and (ii) used, is applied; and
obtaining the adaptive block transform mode when the adaptive block transform flag indicates that the adaptive block transform is applied.

12. A video coding apparatus which codes an input picture on a block-by-block basis so as to generate a coded stream, said apparatus comprising:
a processor;
a notification method determination unit operable to determine, using said processor, a notification method for notifying a transform block size to be used in an orthogonal transform of a current block;
a creation unit operable to create an adaptive block transform mode indicating the notification method; and
a coding unit operable to generate the coded stream and add the adaptive block transform mode to the coded stream,
wherein said notification method determination unit is operable to determine, as the notification method, either (i) an implicit mode in which the transform block size is determined based on information regarding the current block or (ii) an explicit mode in which a transform size flag indicating the transform block size is added to each predetermined unit of blocks, and wherein in the implicit mode, the transform block size is determined based on motion vectors of blocks adjacent to the current block.

13. A video decoding apparatus which decodes a coded stream on a block-by-block basis, said apparatus comprising:

a processor;

an obtaining unit operable to obtain, from the coded stream, an adaptive block transform mode indicating a notification method for notifying a transform block size used in an orthogonal transform of a current block;

an identification unit operable to identify the notification method based on the adaptive block transform mode;

a determination unit operable to determine, using said processor, the transform block size based on the identified notification method; and a decoding unit operable to decode the current block by performing an inverse orthogonal transform on the current block using the determined transform block size, wherein the adaptive block transform mode indicates, as the notification method, either (i) an implicit mode in which the transform block size is determined based on information regarding the current block or (ii) an explicit mode in which a transform size flag indicating the transform block size is added to each predetermined unit of blocks, and wherein in the implicit mode, the transform block size is determined based on motion vectors of blocks adjacent to the current block.

14. An integrated circuit for coding an input picture on a block-by-block basis so as to generate a coded stream, said circuit comprising:

a processor;

a notification method determination unit operable to determine, using said processor, a notification method for notifying a transform block size to be used in an orthogonal transform of a current block;

a creation unit operable to create an adaptive block transform mode indicating the notification method; and a coding unit operable to generate the coded stream and add the adaptive block transform mode to the coded stream, wherein said notification method determination unit is operable to determine, as the notification method, either (i) an implicit mode in which the transform block size is determined based on information regarding the current block or (ii) an explicit mode in which a transform size flag indicating the transform block size is added to each predetermined unit of blocks, and wherein in the implicit mode, the transform block size is determined based on motion vectors of blocks adjacent to the current block.

15. An integrated circuit for decoding a coded stream on a block-by-block basis, said circuit comprising:

a processor;

an obtaining unit operable to obtain, from the coded stream, an adaptive block transform mode indicating a notification method for notifying a transform block size used in an orthogonal transform of a current block;

an identification unit operable to identify the notification method based on the adaptive block transform mode;

a determination unit operable to determine, using said processor, the transform block size based on the identified notification method; and a decoding unit operable to decode the current block by performing an inverse orthogonal transform on the current block using the determined transform block size, wherein the adaptive block transform mode indicates, as the notification method, either (i) an implicit mode in which the transform block size is determined based on information regarding the current block or (ii) an explicit mode in which a transform size flag indicating the transform block size is added to each predetermined unit of blocks, and wherein in the implicit mode, the transform block size is determined based on motion vectors of blocks adjacent to the current block.

16. A video coding apparatus which codes an input picture on a block-by-block basis so as to generate a coded stream, said video coding apparatus comprising:

a processor;

a notification method determination unit operable to determine, using said processor, a notification method for notifying a transform block size to be used in an orthogonal transform of a current block;

a creation unit operable to create an adaptive block transform mode indicating the notification method; and a coding unit operable to generate the coded stream and add the adaptive block transform mode to the coded stream, wherein said notification method determination unit is operable to determine, as the notification method, either (i) an implicit mode in which the transform block size is determined based on information regarding the current block or (ii) an explicit mode in which a transform size flag indicating the transform block size is added to each predetermined unit of blocks, and wherein in the implicit mode, the transform block size is determined based on a quantization step used for quantization of the current block.

17. A video decoding apparatus which decodes a coded stream on a block-by-block basis, said apparatus comprising:

a processor;

an obtaining unit operable to obtain, from the coded stream, an adaptive block transform mode indicating a notification method for notifying a transform block size used in an orthogonal transform of a current block;

an identification unit operable to identify the notification method based on the adaptive block transform mode;

a determination unit operable to determine, using said processor, the transform block size based on the identified notification method; and a decoding unit operable to decode the current block by performing an inverse orthogonal transform on the current block using the determined transform block size, wherein the adaptive block transform mode indicates, as the notification method, either (i) an implicit mode in which the transform block size is determined based on information regarding the current block or (ii) an explicit mode in which a transform size flag indicating the transform block size is added to each predetermined unit of blocks, and wherein in the implicit mode, the transform block size is determined based on a quantization step used for quantization of the current block.

18. An integrated circuit for coding an input picture on a block-by-block basis so as to generate a coded stream, said circuit comprising:

a processor;

a notification method determination unit operable to determine, using said processor, a notification method for notifying a transform block size to be used in an orthogonal transform of a current block;

a creation unit operable to create an adaptive block transform mode indicating the notification method; and a coding unit operable to generate the coded stream and add the adaptive block transform mode to the coded stream, wherein said notification method determination unit is operable to determine, as the notification method, either (i) an implicit mode in which the transform block size is determined based on information regarding the current block or (ii) an explicit mode in which a transform size flag indicating the transform block size is added to each predetermined unit of blocks, and wherein in the implicit mode, the transform block size is determined based on a quantization step used for quantization of the current block.

19. An integrated circuit for decoding a coded stream on a block-by-block basis, said circuit comprising:

a processor;

an obtaining unit operable to obtain, from the coded stream, an adaptive block transform mode indicating a notification method for notifying a transform block size used in an orthogonal transform of a current block;

an identification unit operable to identify the notification method based on the adaptive block transform mode;

a determination unit operable to determine, using said processor, the transform block size based on the identified notification method; and a decoding unit operable to decode the current block by performing an inverse orthogonal transform on the current block using the determined transform block size, wherein the adaptive block transform mode indicates, as the notification method, either (i) an implicit mode in which the transform block size is determined based on information regarding the current block or (ii) an explicit mode in which a transform size flag indicating the transform block size is added to each predetermined unit of blocks, and wherein in the implicit mode, the transform block size is determined based on a quantization step used for quantization of the current block.

* * * * *